US007601015B2

(12) United States Patent
Jackson

(10) Patent No.: US 7,601,015 B2
(45) Date of Patent: Oct. 13, 2009

(54) SELF-ENERGIZING ELECTRICAL CONNECTION

(75) Inventor: Douglas K. Jackson, Austin, TX (US)

(73) Assignee: Novacentrix Corp., Austin, TX (US)

( * ) Notice: Subject to any disclaimer, the term of this patent is extended or adjusted under 35 U.S.C. 154(b) by 865 days.

(21) Appl. No.: 11/071,808

(22) Filed: Mar. 3, 2005

(65) Prior Publication Data

US 2005/0195054 A1 Sep. 8, 2005

Related U.S. Application Data

(60) Provisional application No. 60/549,840, filed on Mar. 3, 2004.

(51) Int. Cl.
*B23K 9/28* (2006.01)

(52) U.S. Cl. .................................. 439/197; 219/137.61

(58) Field of Classification Search ............ 219/137.61, 219/137.2, 137.7, 137.8, 73, 136; 439/197, 439/894; 335/16
See application file for complete search history.

(56) References Cited

U.S. PATENT DOCUMENTS 2,190,150 A * 2/1940 Fay ......................... 219/137.2
2,824,213 A * 2/1958 Shearer, Jr. et al. ...... 219/137.7
2,981,825 A * 4/1961 Rundell ...................... 219/136
3,038,059 A * 6/1962 Hinrichs ................ 219/137.61
3,271,554 A * 9/1966 Johnson ................... 219/76.12
3,936,654 A * 2/1976 Cannata ....................... 219/73
4,386,259 A * 5/1983 Nagai et al. ............. 219/137 R
7,262,386 B2 * 8/2007 Matthews et al. ...... 219/137.61

* cited by examiner

*Primary Examiner*—Neil Abrams
(74) *Attorney, Agent, or Firm*—Antony P. Ng; Dillon & Yudell LLP

(57) ABSTRACT

An electrical connector includes first and second conducting members that are pivotally attached to each other. A portion of the first and second conducting members distal to the pivotal attachment form an electrical contact with the electrode. The first and second conducting member, when operable connected to electric power source, provide parallel current paths for an electric current form the power source to the electrode. Further, the first and second conducting members are configured to provide additional forces at the contact with the electrode in response to magnetic field effects of the current flow Lorentz force), the additional forces having at least a predetermine value when a value of the electric current has a preselected value. For example, the predetermined value of the additional forces may be determined, using known properties of electrical contacts, so as to ensure that the contact does not fail when the current reaches the preselected value.

10 Claims, 10 Drawing Sheets

SELF-ENERGIZING ELECTRICAL CONNECTION

CROSS REFERENCE TO RELATED APPLICATION

This application is related to the commonly owned copending U.S. Provisional Patent Application Ser. No. 60/549,840, "SELF ENERGIZING ELECTRICAL CONNECTION," filed Mar. 3, 2004, and claims the benefit of its earlier filing date under 35 U.S.C. §119(e).

TECHNICAL FIELD

The present invention relates generally, to electrical connections and in particular, to self-energizing contacts, whereby a force of contact between electrical conductors forming the electrical contact dynamically adapts to the current through the contacts, and a contact preload permits relative motion between contacting surfaces without damage to the contacts.

BACKGROUND

Electrical connections are an important aspect of many designs. Typical electrical connections include soldering, clamping and lugs. In order to provide reliable long-term connections, good physical contact between the electrical conductors must exist. Soldering accomplishes this by wetting and bonding to the connectors with an electrically conductive material. Clamping and lugs provide a physical force between the conductors to insure intimate contact. If there is not sufficient contact force between the conductors, localized arcing and/or oxidation of the surfaces can occur, resulting in an unreliable connection. For low current static connections, the required contact force to provide a reliable connection is small and can easily be achieved.

For static electrical connections of intermediate and high currents, the required contact force is proportionally higher. (As used herein, "high current" is generally a current at least about 1000 A). Consequently, one must pay closer attention to this contact force because of the potential for arcing to cause physical damage to the connection and render it useless. Typically, these types of connections are bolted together or mechanically clamped and contact surfaces are treated to minimize corrosion.

For high current pulsed electrical connections, the load on the connection resulting from the current is cyclical and the effects of fatigue and creep must be considered. Over time, if not properly maintained, the contact force will diminish and an arc will occur in the connection resulting in permanent damage.

In the field of pulsed power—in which electricity is modulated at high voltage, high current (i.e., high power), and done so over a short time scale—these types of problems are greatly amplified. A short time scale is defined as the regime where thermal, mechanical and magnetic effects do not approach steady state during the discharge (such as, generally less than about 100 ms and, more generally, less than about 10 ms). The forces generated in a connection are large and make fatigue and creep a major problem. For high current electrical contacts, it is generally empirically understood that a minimum of one gram of force be applied per ampere (1 g/A) of current between two surfaces (this is commonly referred to as "Marshall's Law") or an electric arc will spontaneously form between the surfaces and destroy them. For example, the minimum force required between two surfaces passing a 100, 000 A current would be 100 kg or about 220 pounds (lbs.) force. A person of ordinary skill would understand that Marshall's law is a rule of thumb used within the pulsed power industry. If a connection fails due to insufficient contact force, an electric arc will be formed between the two surfaces. The resistance of the arc is generally higher than the contact resistance between the surfaces. Since the energy deposited in a resistor due to current flow is proportional to the square of the current, proportionally more energy is deposited in the interface. If the power deposited in the arc is high enough, the contact material surface can be heated high enough to form a high-pressure plasma between the interface. The high pressure can explosively blow the interface apart, rendering it ineffective as an electrical connection. In addition, its surrounding may be damaged. This process is not too dissimilar to an explosion. For industrial systems, this can result in a loss of equipment, significant equipment down-time and potentially harm personnel.

The reliability of an electrical connection in these environments can be increased by minimizing the contact resistance between the surfaces such as coating the contact surfaces with a highly conductive material such as silver or applying a corrosion inhibitor to the surfaces. Adequate contact force can be made more reliable by using a compliant preload such as one provided by bolts with Belleville washers. These solutions generally work well when the connections are meant to last a long time without servicing. One such integral solution is known by the brand name of Multilam™ (available from Multi-Contact USA of Santa Rosa, Calif.), which minimizes contact resistance between two surfaces by providing multiple, compliant contact points between them. It contains many small louvers made from a spring material that is sandwiched between the surfaces. Each louver acts as a single contact point for each surface. Each louver can act somewhat independently of the others, so it is much more tolerant to surface imperfections, creep and applied clamping force. Since dozens or even hundreds of contact points can be provided in a small contact area, Multilam™ improves contact resistance and reliability over that predicted by a-spot theory which states that no more than three electrical contact points can be guaranteed when two flat surfaces are clamped together. However, because each louver forms essentially a line or point contact, a high contact pressure is imparted and often damages the mating contact surfaces. This problem limits Multilam™ from being used reliably for high current density applications in which the mating surfaces are being moved relative to each other on a repeated basis. (As used herein, the "current density" is current divided by the cross sectional area of the contact; a "high current density" is generally at least about 10,000 A/cm$^2$.)

The above discussion has been centered around static electrical connections. For dynamic connections, in which one surface is moved relative to another while maintaining contact (such as sliding or rotating) one is faced with the additional problem of having adequate preload to prevent arcing between the contacts coupled with the fact that the preload cannot be so high that static friction prevents the surfaces from moving relative to each other. (Such a dynamic connection will also be referred to as a "dynamic contact.") Furthermore, small imperfections in the surfaces leave them more prone to arcing than nonmovable contact surfaces. This problem is exacerbated when the surface area of the contacts becomes so small that the required preload to prevent arcing nearly deforms the surfaces thereby reducing their lifetime and making them prone to arcing. This problem is also exacerbated when the cross sectional area of the conductor to which it is desired to couple power becomes so small that it becomes difficult to push it through the coupler without buckling it.

In short for dynamic high current applications it is desirable to have the surfaces continually in contact allowing them to slide relative to each other, but have the required clamping force applied to the surfaces only when current is pulsed through them. Extreme care must be taken to make sure that sufficient clamping force is applied every time that the current is pulsed through the contact. One failure may be catastrophic.

All of these connections have one factor in common; they require a high preload force that must be well maintained to prevent catastrophic failure. Because of this, their application in movable electrical contacts in pulsed power applications is limited. Additionally, if the connection sees a current that exceeds its designed clamping force, then the connection will fail.

Thus, there is a need in the art for a mechanism to provide a clamping force in moveable electrical contacts sufficient to prevent catastrophic arcing at the contact while high current is flowing but which permits freedom of relative sliding movement of the contacting conductors when little or no current is flowing. Additionally, there is a further need in the art for a clamping force that adapts to the current carried by the contact.

SUMMARY

Disclosed is a system and method for electrically coupling a high power, pulsed power delivery system to a conductor that is indexed repetitively or continuously relative to the coupler. For instance, the system can be cycled at high peak current (~$10^5$ A or greater) for moderate pulse lengths (~10 ms or less and, more generally, ~1 ms or less) at high repetition rate (greater than about 0.1 Hz and, more generally greater than about 1 Hz) for many cycles (greater than about $10^5$ and, more generally, greater than about $10^6$).

This invention addresses the general problem of coupling high power, pulsed power to a small conductor that is indexed relative to the coupler. When it is desired to pass a large current through a small cross-section conductor that is pushed through a coupler, a problem occurs; the required minimum preload force to maintain a nonarcing electrical connection between the small conductor and the coupler is so great that the conductor buckles or the contact surfaces are mechanically deformed or galled. The present invention addresses this problem by:

A. Applying a small static force (i.e., generally less than that required by Marshall's Law for the maximum operating current) between the contact surfaces. Since the conductor may be sliding and there may be minor deformations in the thickness of the conductor, the static force must be compliant to guarantee that there is always a force and therefore a nonarcing electrical connection between the surfaces. This is done so that arcing does not occur when the current first starts to flow. That is, the force must be like the force provided by a spring, a hydraulic force, or the like: minor changes in the dimensions of the clamp do not significantly affect the force that it applied.

B. Applying a dynamic self-energizing force that increases with the current flowing through the connections. In an embodiment of the invention, this force is a Lorentz force that is provided by the interaction of the current through the coupler and its self magnetic field. This force, which is proportional to the square of the current, causes the coupler to clamp the conductor only during the current discharge.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION

Figure 1:
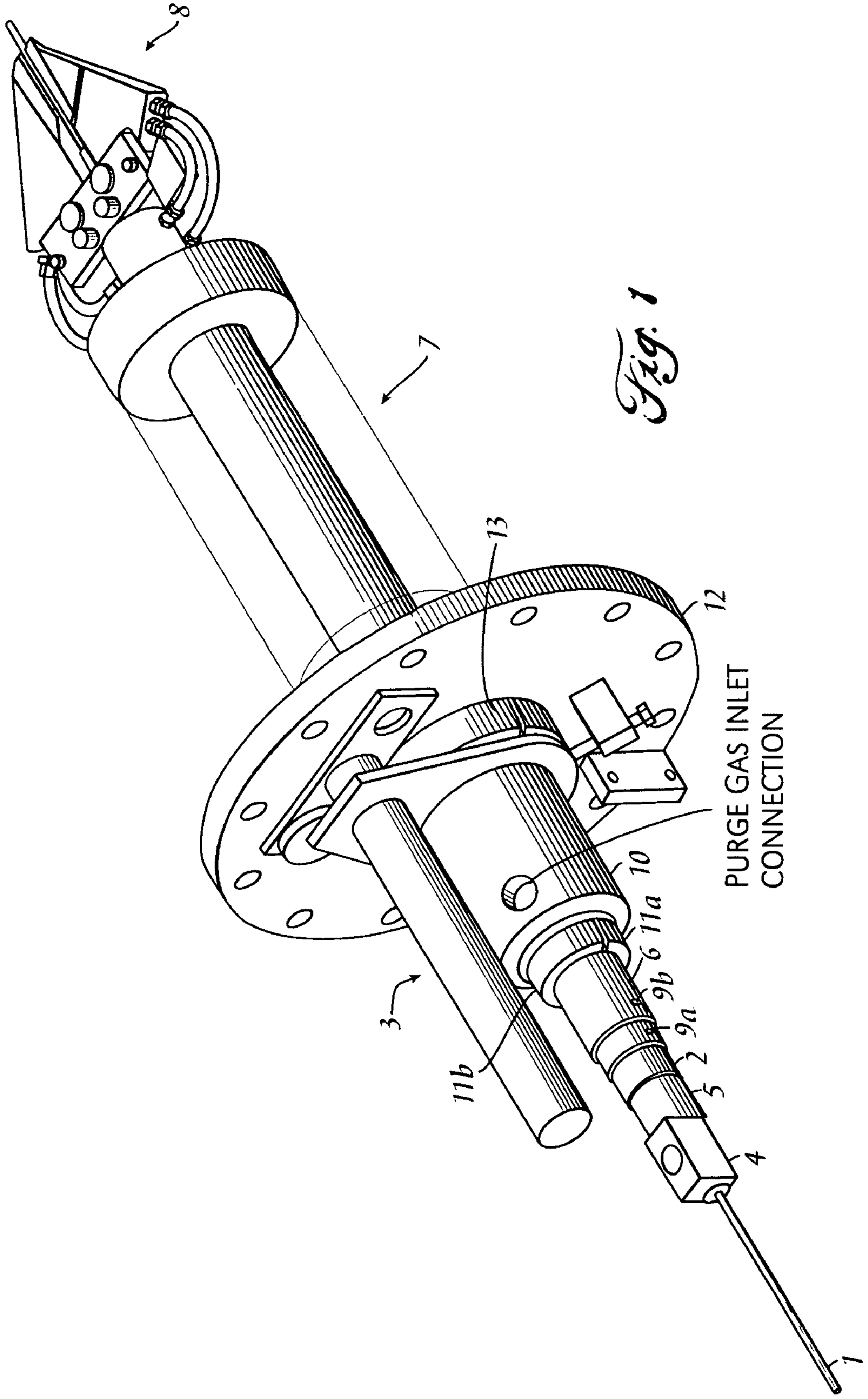
FIG. 1 illustrates a perspective view of a self-energizing electrical connection in accordance with an embodiment of the present invention.

The present invention addresses these problems, by incorporating a self-energizing clamping force. The connection requires a moderate preload and uses the applied current to generate a Lorentz force that applies the remainder of the required force to prevent catastrophic failure. The moderate preload is such that the two contact surfaces can be moved relative to each other without damaging the components while the self-energizing feature provides sufficient clamping force to maintain a nonarcing electrical connection when the current is applied. Additionally, because the self-energizing force is proportional to the square of the applied current, the connection is much more tolerant to over-current conditions.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a self-energizing electrical coupler in accordance with an embodiment of the present invention. The coupler may be used to provide high current, pulsed power to an indexable consumable electrode 1. (Electrode 1 may, for example, be used as a feedstock for making nanomaterials in accordance with the methodology described in the commonly owned U.S. Pat. No. 6,777,639, hereby incorporated herein by reference).

However, the coupler may be used to provide a dynamic contact in any system requiring an electrical contact allowing a relative motion between the contacting electrical conductors forming the contact.

The high current, pulsed power system is electrically connected to coupler at the primary electrical connection point 2 and at the ground connector assembly 3. The electrode 1 is indexed through the check valve 4 using a feed mechanism (not shown) attached at connection point 5. In the application of the coupler to the production of nanopowders noted above, check valve 4 permits the removal or replacement of electrode 1 while the coupler remains in place in the production system which is typically operated at a pressure slightly greater than atmospheric. Electrode 1 passes through the conductor/coolant manifold 6 and the insulator assembly 7 and into the gripper assembly 8. The conductor/coolant manifold 6 has an inlet coolant port 9*a* and an outlet coolant port 9*b* to actively cool and remove the heat generated by the high currents and power. The conductor/coolant manifold 6 is electrically insulated from the ground connector assembly 3 by means of the main insulator 10. Conductor/coolant manifold 6 can move axially relative to the main insulator to adjust the position of gripper assembly 8. The position of the conductor/coolant assembly 6 is locked by means of insulator clamp 11*a* and a heavy duty hose clamp 11*b* (not shown). The main insulator 10 is attached to the flange 12 by means of the insulator-to-flange clamping wedge 13. Insulator 10 may be fabricated from common MDS filled nylon in an embodiment of the coupler. Insulator-to-flange clamping wedge 13 allows the main insulator 10 and consequently the rest of the assembly to move relative to the flange 12 and to lock it in place. A heavy-duty hose clamp (not shown) may be used to provide the clamping force on clamping wedge 13. This allows accurate positioning of the electrode tip. Flange 12 may be 150 lb stainless ANSI flange. In one embodiment of the coupler, flange 12 has a diameter of fourteen inches (14"), however the characteristics of flange 12 do not implicate the present inventive principle and may be reflective of the application environment of the coupler.

Figure 2:
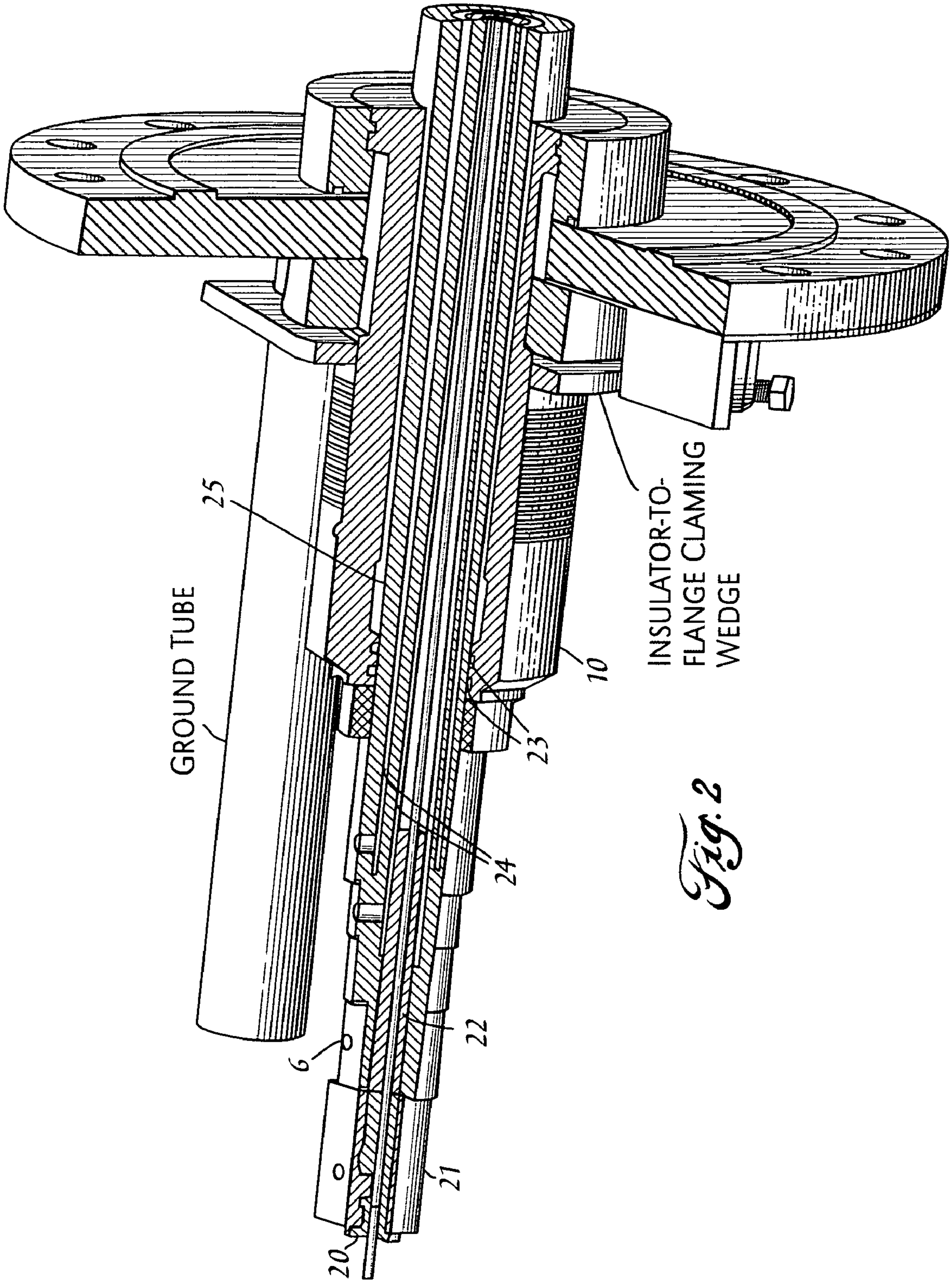
FIG. 2 illustrates a cutaway view of a rear insulator assembly portion of the self-energizing electrical connection in accordance with the embodiment of FIG. 1.

FIG. 2 shows a cut-away view of the main insulator 10 and the surrounding components. A rear electrode seal cartridge 20 is positioned where the electrode 1 enters the conductor/coolant manifold 6 and a main seal cartridge 22 positioned with the conductor/coolant manifold 6 to provide a pressure seal around the electrode. In an embodiment of the present invention used in a pressurized environment, such as nanoparticle production using the aforementioned methodology, any gas inside a reaction chamber is maintained. (The reaction chamber used in the production of nanoparticles in accordance with the methodology described in the aforementioned commonly owned U.S. Pat. No. 6,777,639 operates slightly above atmospheric pressure.) Similarly, a check valve assembly 21 is activated when the electrode is removed from the conductor/coolant manifold 6. The conductor/coolant manifold 6 is in turn sealed to the main insulator 10 via O-rings 23. The conductor/coolant manifold 6 includes a concentric tube assembly to provide coolant channels 24 to actively cool the assembly and to allow coolant to be fed to the gripper assembly. Additionally the main insulator 10 contains a purge gas passage 25 to allow clean gases to be injected into the system. Again, in the application of an embodiment of a self-energizing electrical coupler to nanoparticle production, a purge gas may be introduced to effect the removal of particulate matter that may have inadvertently invaded the interstices in the coupler. Removal of such particulate matter in this way is, in particular, advantageous when using the coupler in conjunction with the production of nanoparticles of electrically conductive materials.

Figure 3:
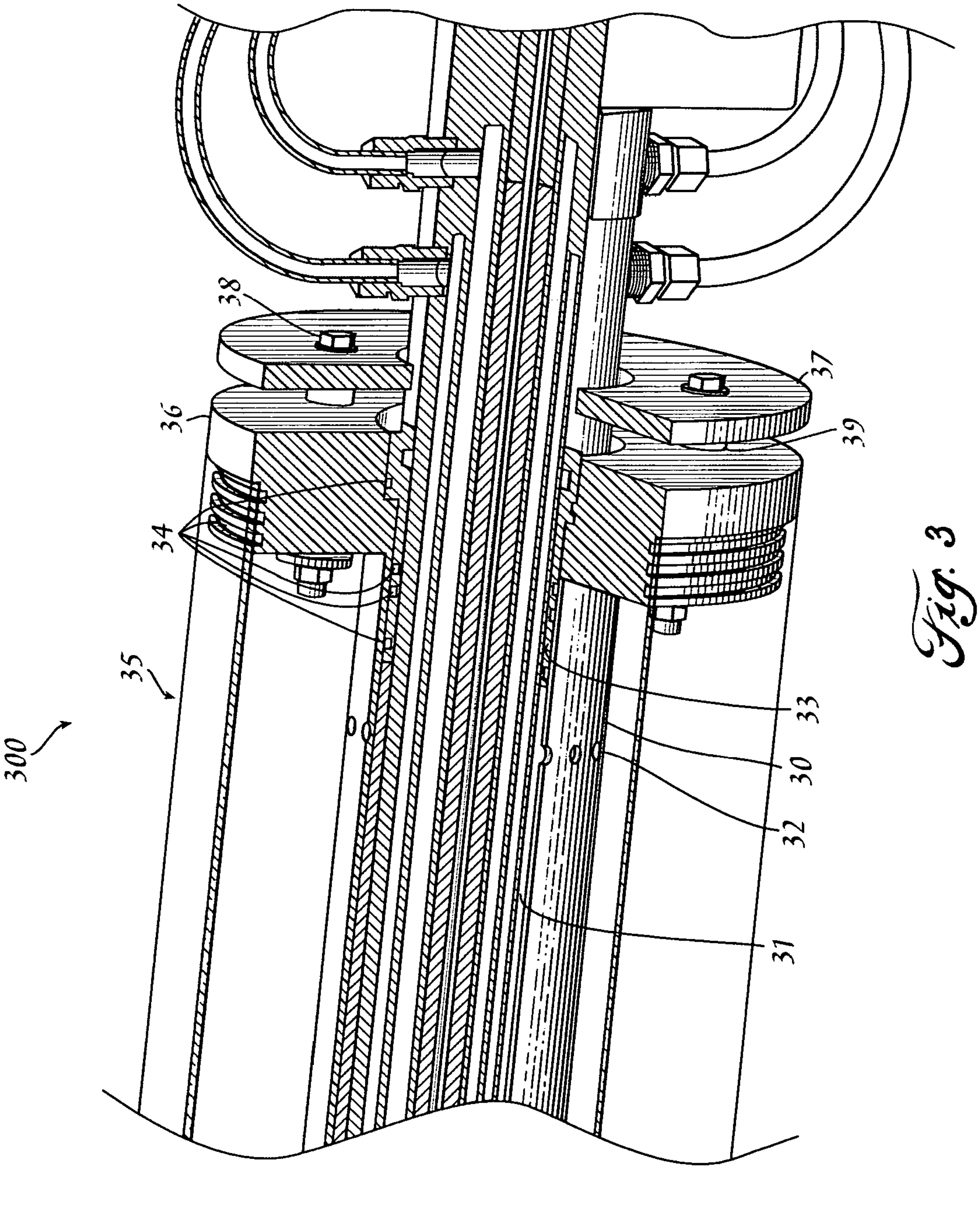
FIG. 3 illustrates a cutaway view of a front insulator assembly portion of the self-energizing electrical connection in accordance with the embodiment of FIG. 1.

FIG. 3 shows, in further detail, a section view of the front insulator assembly 300. The purpose of the front insulator assembly 300 is to electrically isolate the gripper assembly from the flange 12. The inner insulator tube 30 is connected to the main insulator 10 and covers the connector/coolant manifold 6. In an embodiment of the present invention, inner insulator tube may be made of polycarbonate. The annular area formed between the inner insulator tube 30 and the connector/coolant manifold 6 provides the purge gas flow channel 31, which connects to the purge gas outlet holes 32. The purge gas flow channel 31 is sealed on the end by the insulator flange bushing 33 with O-rings 34, which insure the purge gas exits the outlet holes 32. Once the purge gas exits the outlet holes 32, it is contained by the outer insulator shield tube 35, which also redirects the purge gas towards the flange 12. In an embodiment of the present invention, outer insulator shield tube 35 may be made of polycarbonate. As previously discussed, during metal nanoparticles production this may be particularly advantageous because it prevents the conductive particles from coating the insulator and forming a conductive electrical path that could be detrimental to the system. The outer insulator shield tube 35 is held in place by the front insulator flange 36 and sealed by O-rings (not shown) retained in O-ring groves 34. In an embodiment of the present invention, the insulator shield tube 35 is axially fixed by O-rings. Additionally the front insulator flange 36 is connected to the inner insulator tube 30. In one embodiment of the invention, the front insulator flange 36 is made of MDS-filled nylon.

During the production of nanoparticles, a hot plasma is formed at the tips of the electrodes, such as electrode 1 as shown in FIG. 1. In an embodiment used in the production of nanoparticles, an insulator thermal shield 37 may be used to protect the front insulator flange 36 from the thermal radiation of the plasma. The insulator thermal shield plate 37 is held in place by bolts 38 and offset from the front insulator flange 36 by Teflon (PTFE) standoff bushings 39.

Figure 4:
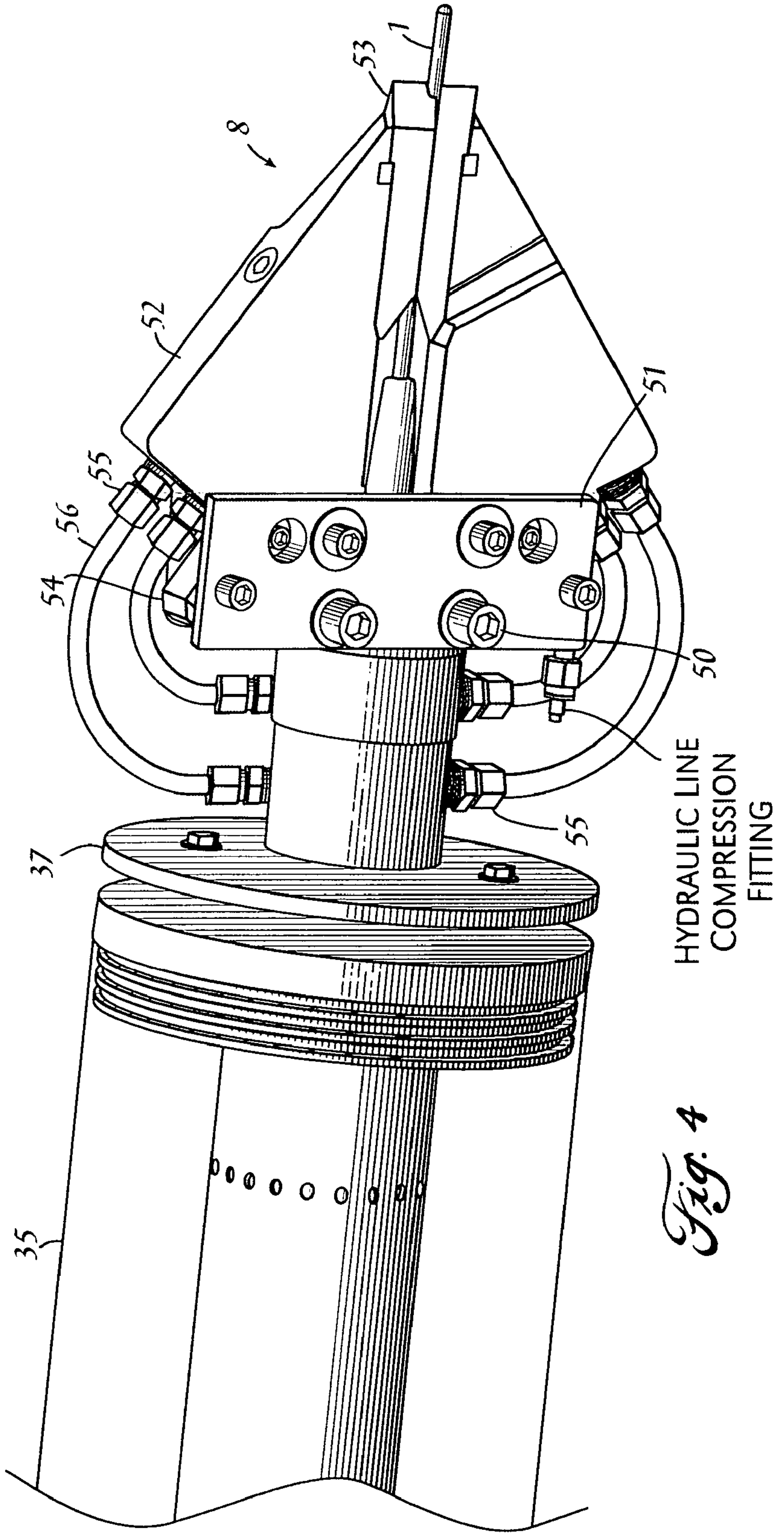
FIG. 4 illustrates in further detail a gripper portion of the self-energizing electrical connection in accordance with the embodiment of FIG. 1.

FIG. 4 depicts an external side view of the gripper assembly 8. The gripper assembly is where the electrical current passes from the connector/coolant manifold 6 to the consumable electrode 1. The pivot plate 51 attaches the gripper assembly to the connector/coolant manifold 6 using bolts 50. The gripper assembly is comprised of two gripper arms 52 (also called "gripper wedges"), two replaceable contact inserts 53 and two hydraulic cylinders 54. In operation, the electrical current passes through the connector/coolant manifold 6, is divided between the two gripper arms 52, and then passes through the replaceable inserts 53 into the electrode 1. Replaceable inserts 35 may be fabricated from metal-impregnated graphite (such as one manufactured by Poco Graphite of Decatur, Tex.). Additional details are described in FIGS. 5 and 6. Gripper arms 52 pivot on two pivot pins (not shown) disposed beneath pivot pin shield covers 96. In this way, a dynamically adaptive contact force may be applied between inserts 53 and electrode 1 as the current through the connector increases. This will be described further in conjunction with FIG. 6, hereinbelow.

Because of the ohmic heating associated with high currents and, in an embodiment of the present invention used in the production of nanoparticles, heating of the components can become an issue due to radiation from the plasma. To address this issue, the gripper arms 52 are actively cooled. Coolant passes from the connector/coolant manifold 6 through coolant hose 56, which is connected using compression fittings 55.

Figure 5:
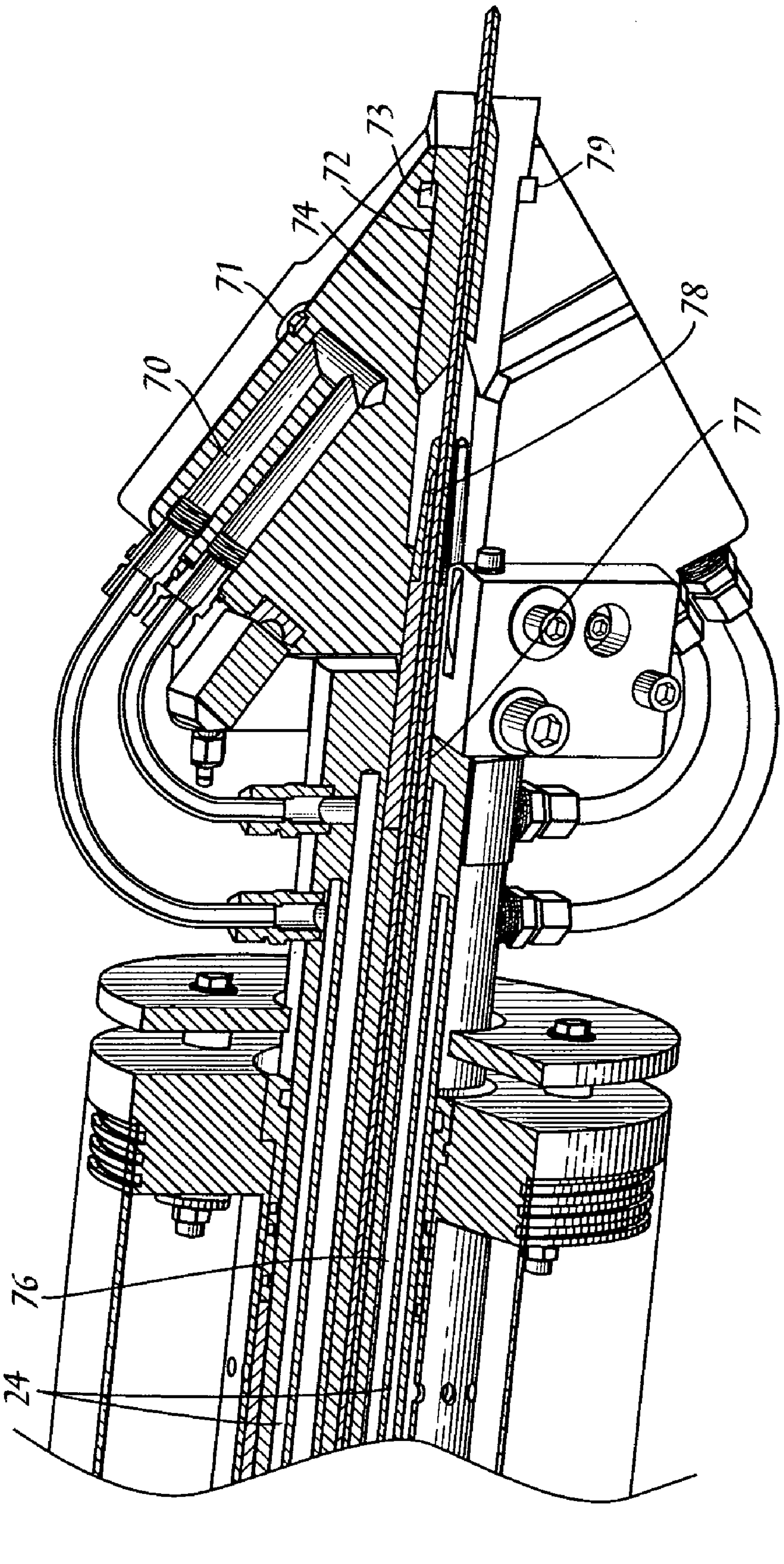
FIG. 5 illustrates a cutaway view of the gripper portion of FIG. 4.

FIG. 5 show a cutaway view of the gripper assembly 8 in which a portion of pivot plate 51 and the underlying pivot mechanism, and internal electrode support structures have been removed to illustrate the disposition of the electrode within gripper assembly 8 in further detail. Additionally a portion of gripper arms 52 has also been removed to illustrate the flow path of the coolant channels 70 within the gripper assembly. The channels may be drilled from the top into the body of the gripper arm and then connected by cross-drilling through both holes. The cross-drilled hole is then plugged using a pipe plug 71 to provide a circular flow path through the gripper arm 52.

The mechanism for retaining the replaceable contact inserts 53 within the gripper assembly are also visible in FIG. 5. The gripper arm contains a dovetail groove 72 that is matched to a dovetail on the replaceable contact insert 53. To replace the insert, the replaceable contact insert 53 is slid starting at the front of the gripper arm into the dovetail groove 72. The contact retaining block 79 is then slid between the replaceable insert 53 and the gripper arm and is held in place by the spring plunger 73. Additionally, the inside of the dovetail groove is lined with felt metal (such as a material from Technetics Corp., DeLand, Fla., that resembles typical felt but is made from copper). This felt metal insures that there are multiple, compliant contact points, which allows for greater surface variances between the two components. As previously described, the replaceable contact insert 53 is made from graphite impregnated with a metal of good electrical conductivity such as copper or silver. These particular materials have good lubricity and electrical conductivity.

Figure 10:
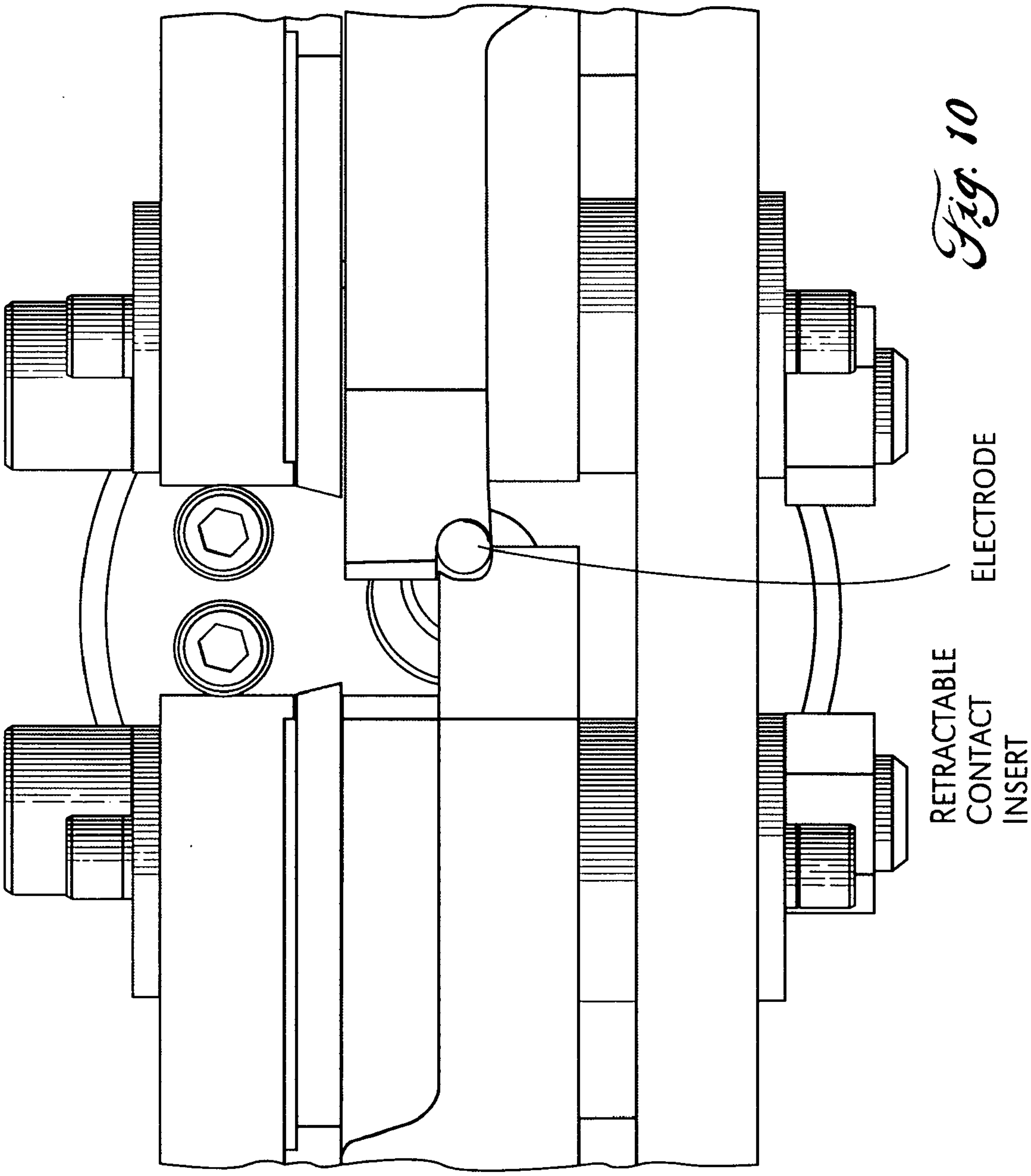
FIG. 10 illustrates a close-up view of the contact insert illustrated in FIG. 4.

FIG. 10 shows a close-up view of the contact insert. Each contact insert 53 has approximately 150 degrees of contact on the diameter of the electrode. This is done so that as the inserts wear, they can slide past another. Consequently, large amounts of wear can be tolerated. If the contact inserts do not slide past one another, as they wear, they would eventually contact one another. This would then render the design ineffective. While the contact area is 150 degrees for the preferred embodiment, one skilled in the art would recognize that other angles could be used as well as other designs that prevent the contact inserts from coming into contact with one another without deviating from the spirit of the design.

FIG. 5 also depicts the passage of electrode 1 through the gripper assembly. As the electrode passes through the connector/coolant manifold 6, it is insulated and guided by the electrode guide tube 76. Attached to the end of the electrode guide tube 76 is the insulating electrode guide bushing 77 which insures that the electrode is in the correct position to enter the replaceable contact inserts 53. In an embodiment of the present invention, the insulating electrode guide bushing 77 is made from a good insulating material such as Garolite G-10 and is protected from the high thermal loads by the electrode guide thermal shield 78, which may be comprised of stainless steel.

Figure 6:
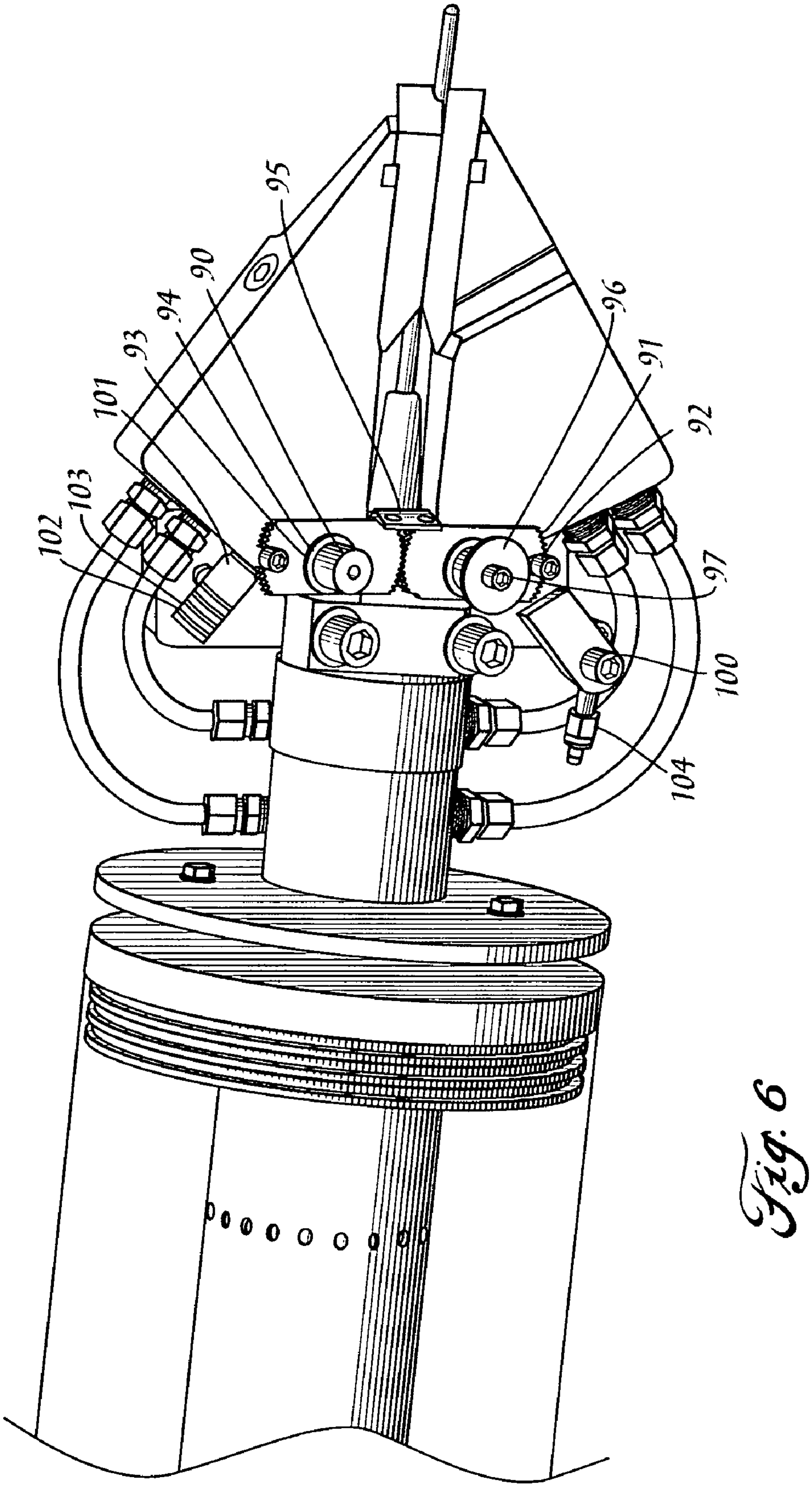
FIG. 6 illustrates another cutaway view of the gripper portion of FIG. 5.

FIG. 6 illustrates a cutaway view of gripper assembly 8. In FIG. 6, the pivot plate 51 has been removed to expose the pivoting mechanism of the gripper assembly. Each gripper arm 52 pivots with the pivot pins 90, which are pressed into the gripper arm 52. Two gripper-centering gears 91 are positioned around the pivot pins 90 and connected to the gripper arms 52 by means of bolt 92. The gripper centering gears 91 ensure that the gripper arms 52 stay centered and move equally relative to the electrode 1. Pivot O-ring 93 and the pivot O-ring cover ring 94 seal dust and other foreign materials out of the pivot connections. In an embodiment used in the production of nanomaterials, such sealing of the pivot connections may be advantageous. Similarly, the gripper centering gears are protected from the hot plasma by the gear shield plate 95. Pivot pin shield cover 96 held in place by bolt 97 is used to seal the pivot pin connection. FIG. 6 also shows a cutaway of one of the hydraulic cylinders 54 that are used to actuate the grippers and apply the initial preload force to the electrode 1. The hydraulic cylinders are held in place by and pivot around bolt 100. Inside the hydraulic cylinder is a hydraulic piston 101 which seals using the O-rings 102 and Teflon (PTFE) back-up rings 103. A hydraulic pressure line (not shown) is connected to the hydraulic cylinders 54 via the hydraulic connections 104. When pressure is applied to the hydraulic cylinders, a force is imparted on the gripper arms that causes them to rotate around the pivot pins 90. Additionally, the force insures that there is intimate contact between the pivot pins and pivot plate for a nonarcing electrical contact. The torque generated on the gripper arm is translated into a contact force between the replaceable contact inserts 53 and the electrode 1.

In operation, a hydraulic pressure is applied to the hydraulic cylinders 54. In an embodiment of the present invention a contact force of approximately 40-80 lbs. may be maintained thereby. It would be appreciated by those of ordinary skill in the art that this range of force is exemplary and that other values may be used in alternative embodiments. In particular, a force sufficient to give the initial preload but not so great that the electrode cannot be moved through the contact inserts 53 is provided. If too much hydraulic pressure is applied, the electrode may bind or gall in the inserts or even buckle as it is fed into the gripper assembly. As would be recognized by artisans of ordinary skill, the force at which galling occurs depends on the electrode material and the insert material. For example, electrodes of softer material such as aluminum, will gall at lower preloads than harder materials such as titanium. Other factors that can influence the tendency to gall are the diameter of the electrode, surface finish, the insert material, and the electrode feed rate. Once the preload is applied to the gripper arms, the pulsed power current is applied to the connector/coolant manifold 6. As the current rises, it passes from the connector/coolant manifold 6 and through the pivot pins 90 where it is divided into two flow paths. The current then passes through the replaceable contact inserts 53 into the electrode 1. When the current passes through the two gripper arms, an attractive Lorentz force pulls the two gripper arms together. This additional force insures that the contact force on the electrode is sufficient to prevent arcing in the contact inserts 53. Once the current pulse has passed, the only remaining contact force on the electrode is the hydraulic preload force and the electrode can be indexed without being damaged.

Figure 7:
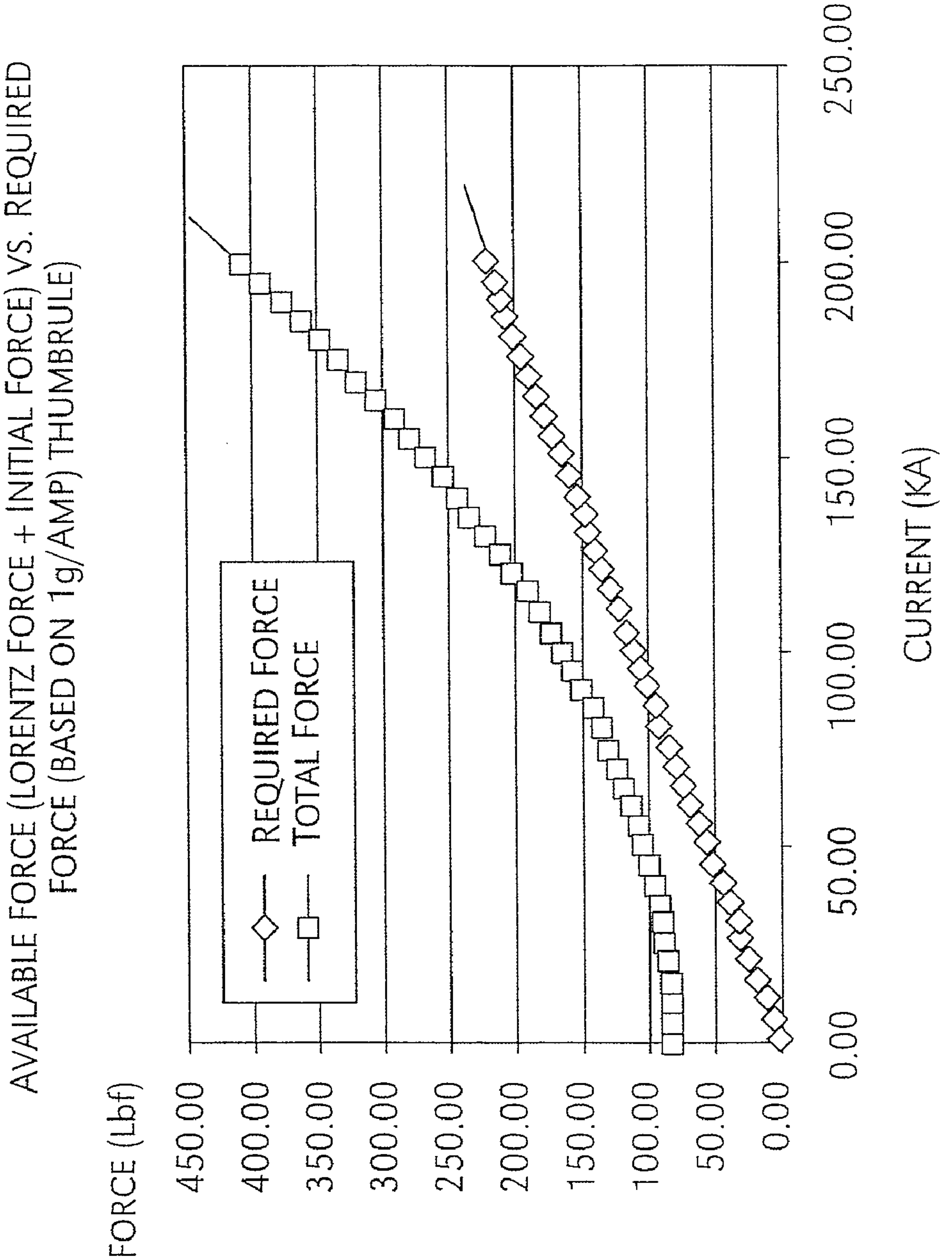
FIG. 7 graphically illustrates the contact force as a function of current carried by the connector in accordance with the present inventive principles.

FIG. 7 shows a graph of the 1 gram of force per ampere (1 g/A) according to Marshall's Law needed to maintain a nonarcing connection for high current electrical contacts. Also shown on the graph of FIG. 7 is the initial theoretical hydraulic preload force plus the theoretical Lorentz force as a function of current for an embodiment of the present invention. (This graph reflects the force per gripper arm for an embodiment with two gripper arms). Recall that the Lorentz force arises from the current in one of the gripper arms interacting with the magnetic field produced by the current flowing through the other. Notice that the Lorentz force is proportional to the square of the current and as a result at low currents do not contribute much to the force needed to maintain a nonarcing electrical connection for the embodiments disclosed herein. However, at higher currents its contribution is more than sufficient to maintain a nonarcing electrical connection. By using a preload force that adds directly to the Lorentz force, the design maintains a sufficient force over all currents.

Another aspect of the design that must be considered is the response time of the grippers. Because the pulses are short in duration and the forces are relatively high, the gripper arms must be able to respond quickly to the Lorentz forces. Preferably the gripper arms have a high stiffness and a low inertial mass. For the preferred embodiment, the triangular shape of the gripper arm provides high stiffness while minimizing the mass. Additionally, copper may be used because it has good electrical conductivity and high elastic modulus.

Figure 8:
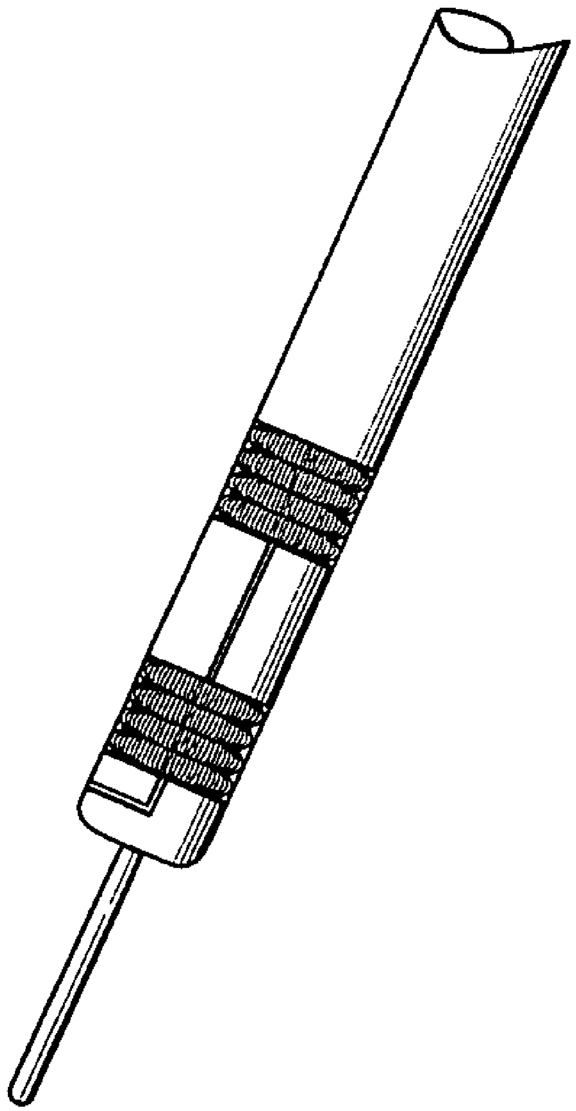
FIG. 8 illustrates an external view of an alternative embodiment of the invention.
Figure 9:
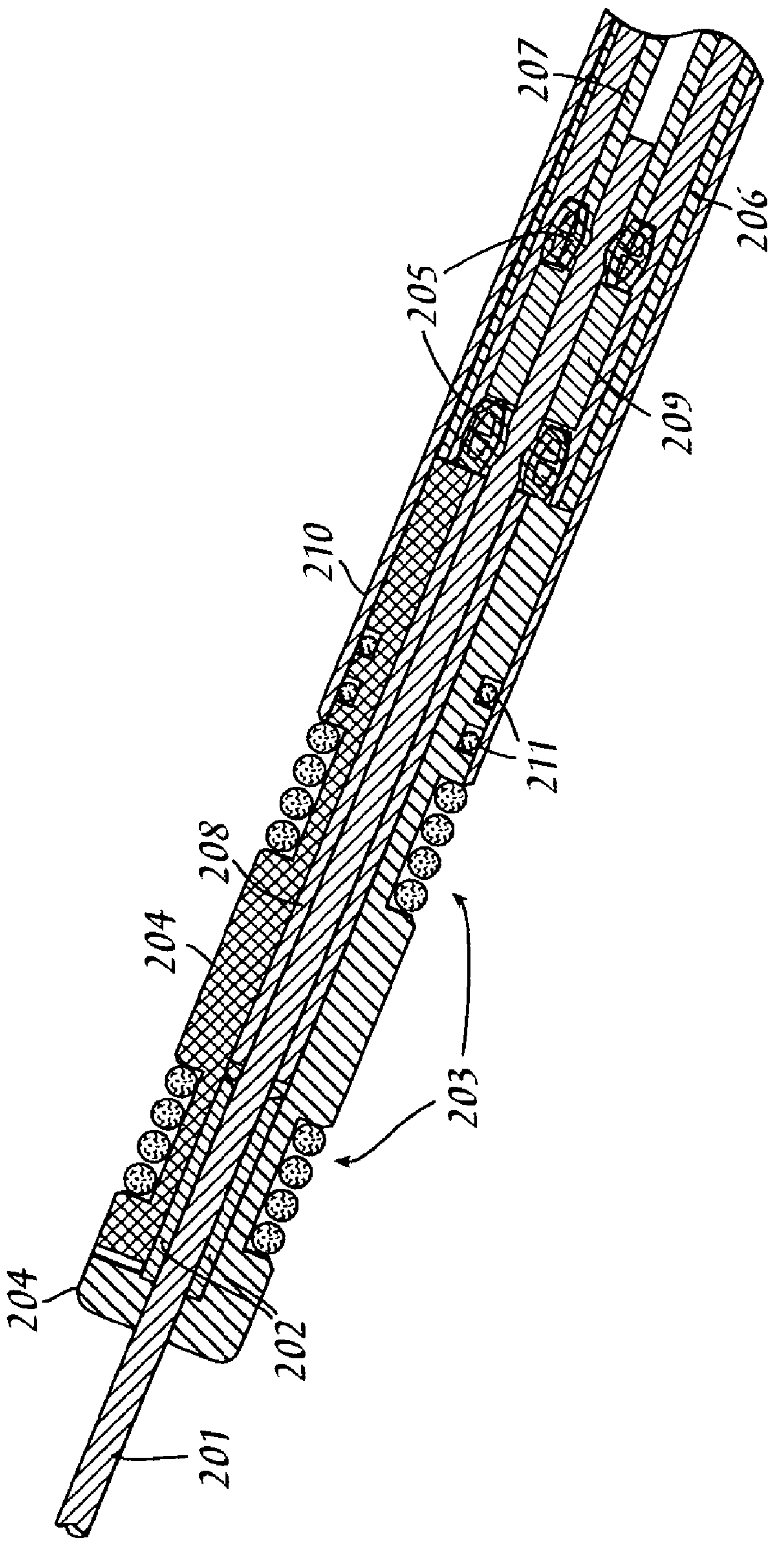
FIG. 9 illustrates an section view of the alternative embodiment of the invention illustrated in FIG. 8.

FIGS. 8 and 9 show an external view and section view, respectively, of an alternative embodiment of the invention. In FIG. 9 the electrode 201 passes through the conductor tube 206, which is connected to the pulsed power system. The conductor tube 206 is contained within the insulator housing 210, which is in turn sealed against the gripper assembly 204 by O-rings 211. Insulators 207, 208 and 209 electrically isolate the electrode from the conductor tube 206. Seals 205 are used to hydraulically seal against the electrode and prevent the gas in the reactor from escaping. The end of the conductor tube 206 is electrically connected to the two halves of the gripper assembly 204. The two halves of the gripper assembly are held together by garter springs 203. Each half of the gripper assembly has a replaceable insert 202, which provides the electrical connection to the electrode. The garter springs 203 also provide the preload force for the electrical connection while still allowing the electrode to slide through the inserts. In operation, the preload allows nonarcing electrical contact during the initial ramping of the current pulse. As the current increases the Lorentz force is increased due to current passing through both split halves of the gripper assembly and provides the remainder of the force to maintain a nonarcing electrical connection.

Although the present invention and its advantages have been described in detail, it should be understood that various changes, substitutions and alterations can be made herein without departing from the spirit and scope of the invention as defined by the appended claims. For example, the invention could use multiple arms that interact with one another or a single arm that interacts with a magnetic field to generate the Lorentz force.

What is claimed is:

1. An electrical connector comprising:

a high current source; and a first and second gripper arms electrically connected to said high current source and an electrode capable of being moved between said first and second gripper arms, wherein said first and second gripper arms are configured to provide parallel current paths for electric current to flow from said high voltage source to said electrode, and to grip said electrode via an initial gripping force as well as an additional gripping force according to magnetic field effects proportional to a magnitude of said electric current flowing through said first and gripper arms to said electrode, wherein said additional gripping force is the dominant force over said initial gripping force during operation, wherein said additional gripping force is a Lorentz force and wherein said electric current has a peak magnitude of at least approximately 10,000 A.

2. The electrical connector of claim 1, wherein said first gripper arm includes a dovetail insert and said second gripper arm includes a dovetail grove insert for receiving said electrode.

3. The electrical connector of claim 1, wherein said electric current is a set of electric current pulses having a frequency of at least approximately 0.1 Hz.

4. The electrical connector of claim 1, wherein said electric current is a set of electric current pulses having pulse widths of at most approximately 10 ms.

5. The electrical connector of claim 1, wherein a portion of at least one of said first and second gripper arms includes a replaceable contact block forming an electrical contact with said electrode.

6. The electrical connector of claim 5, wherein said replaceable contact block includes a metal selected from the group consisting of copper, silver, nickel, and combinations thereof.

7. The electrical connector of claim 5, wherein said replaceable contact blocks include metal-impregnated graphite.

8. The electrical connector of claim 7, wherein said metal-impregnated graphite said a metal selected from the group consisting of copper, silver, and combinations thereof.

9. The electrical connector of claim 1, wherein said electrical connector further includes a spring coupled to said first and second gripper anns, wherein said spring provides, at least in part, said initial gripping force.

10. The electrical connector of claim 1, wherein said electrical connector further includes a hydraulic cylinder containing a piston coupled to said first and second gripper arms, wherein said hydraulic cylinder provides, at least in part, said initial gripping force.

* * * * *